United States Patent
Kojima et al.

(10) Patent No.: US 6,186,756 B1
(45) Date of Patent: Feb. 13, 2001

(54) SHAFT STRUCTURE IN SCREW ROTOR OF SCREW FLUID ASSEMBLY

(75) Inventors: Yukihiro Kojima, Niigata-ken; Tetsuya Sasage, Shirone; Noboru Toda, Niigata-ken, all of (JP)

(73) Assignee: Hokuetsu Industries Co., Ltd., Bunsui-Machi (JP)

( * ) Notice: Under 35 U.S.C. 154(b), the term of this patent shall be extended for 0 days.

(21) Appl. No.: 09/572,049

(22) Filed: May 16, 2000

Related U.S. Application Data

(62) Division of application No. 09/111,446, filed on Jul. 8, 1998.

(51) Int. Cl.[7] ........................................ F04C 2/00
(52) U.S. Cl. .................. 418/152; 418/201.1; 418/48; 418/137; 310/261; 310/43
(58) Field of Search ................ 418/201.1, 152, 418/48, 137; 310/261, 43

(56) References Cited

U.S. PATENT DOCUMENTS

| | | | |
|---|---|---|---|
| 4,588,911 | * 5/1986 | Gold | 310/43 |
| 4,599,056 | * 10/1993 | Crase | 418/48 |
| 4,886,695 | * 12/1989 | Mizuno et al. | 428/137 |
| 5,252,879 | * 10/1993 | Romberg et al. | 310/261 |

FOREIGN PATENT DOCUMENTS

| | | |
|---|---|---|
| 1-301976 | of 0000 | (JP) . |
| H2-71108 | of 0000 | (JP) . |
| H6-123292 | of 0000 | (JP) . |
| S52-25562 | of 0000 | (JP) . |
| S56-49311 | of 0000 | (JP) . |
| S57-105418 | of 0000 | (JP) . |
| 401305190 | * 12/1989 | (JP) ................................ 418/201.1 |
| 405288175A | * 11/1993 | (JP) ................................ 418/201.1 |
| 10201152A | * 7/1998 | (JP) . |

* cited by examiner

*Primary Examiner*—Thomas Denion
*Assistant Examiner*—Thai-Ba Trieu
(74) *Attorney, Agent, or Firm*—Christie, Parker & Hale, LLP

(57) ABSTRACT

A rotor 1 forming screw teeth is projectingly provided at its outer end 2 on the axis thereof with a center shaft 3. The center shaft 3 is provided at its outer end 4 with a smaller-diameter shaft 5 or a concaved fitting hole. A separate rotor shaft 6 which is to be fitted over the smaller-diameter shaft 5 or fitted into the concaved fitting hole is provided with another concaved fitting hole 7 or smaller-diameter shaft. A metal shaft around which synthetic resin is molded is formed at its peripheral surface with a spiral groove or corrugated groove in the opposite revolutional direction with respect to the revolutional direction of the screw rotor. The spiral groove is formed with smooth arc curved line connecting profiles of adjacent grooves. The shaft is provided with a step, and synthetic resin is molded around the shaft surface to form a screw rotor.

7 Claims, 10 Drawing Sheets

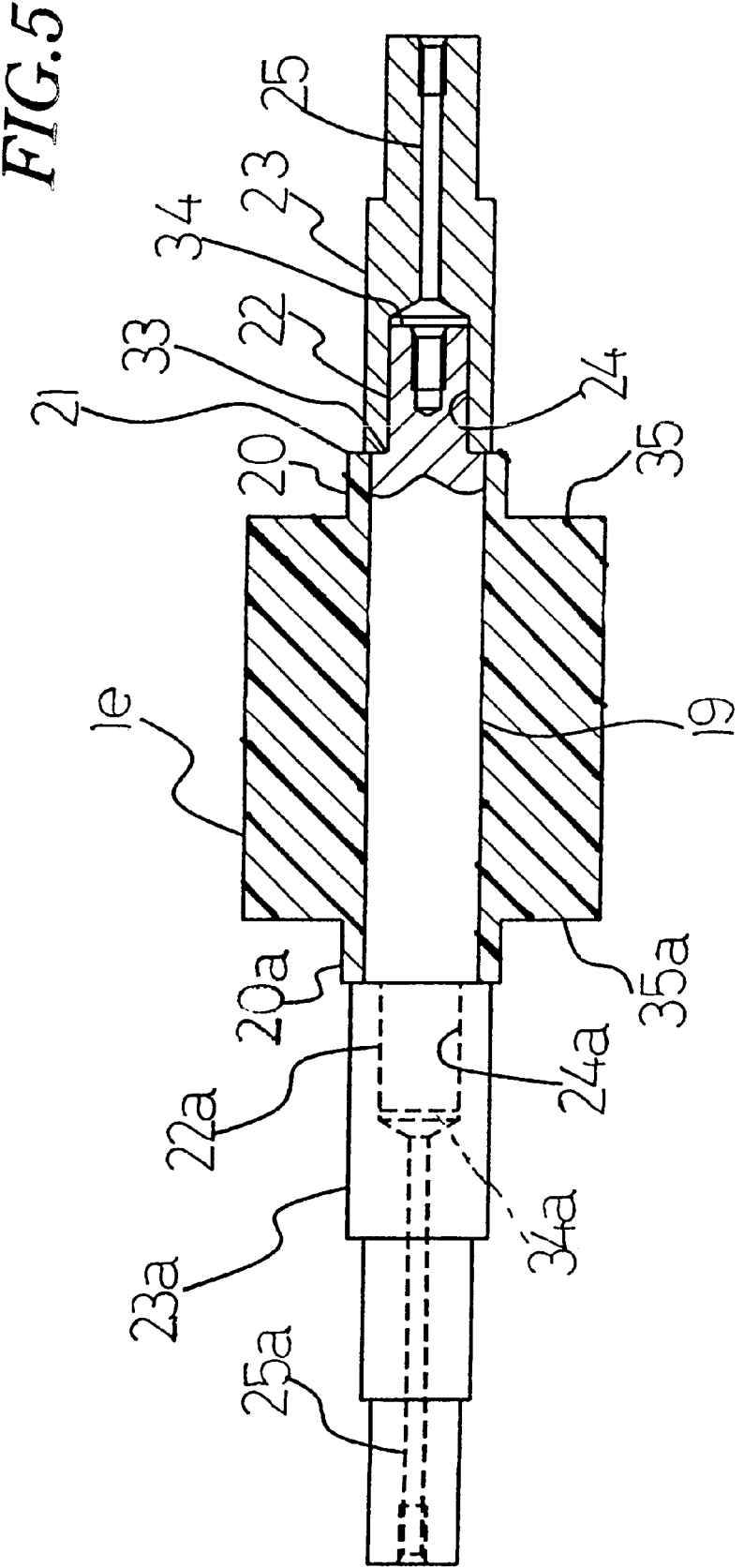

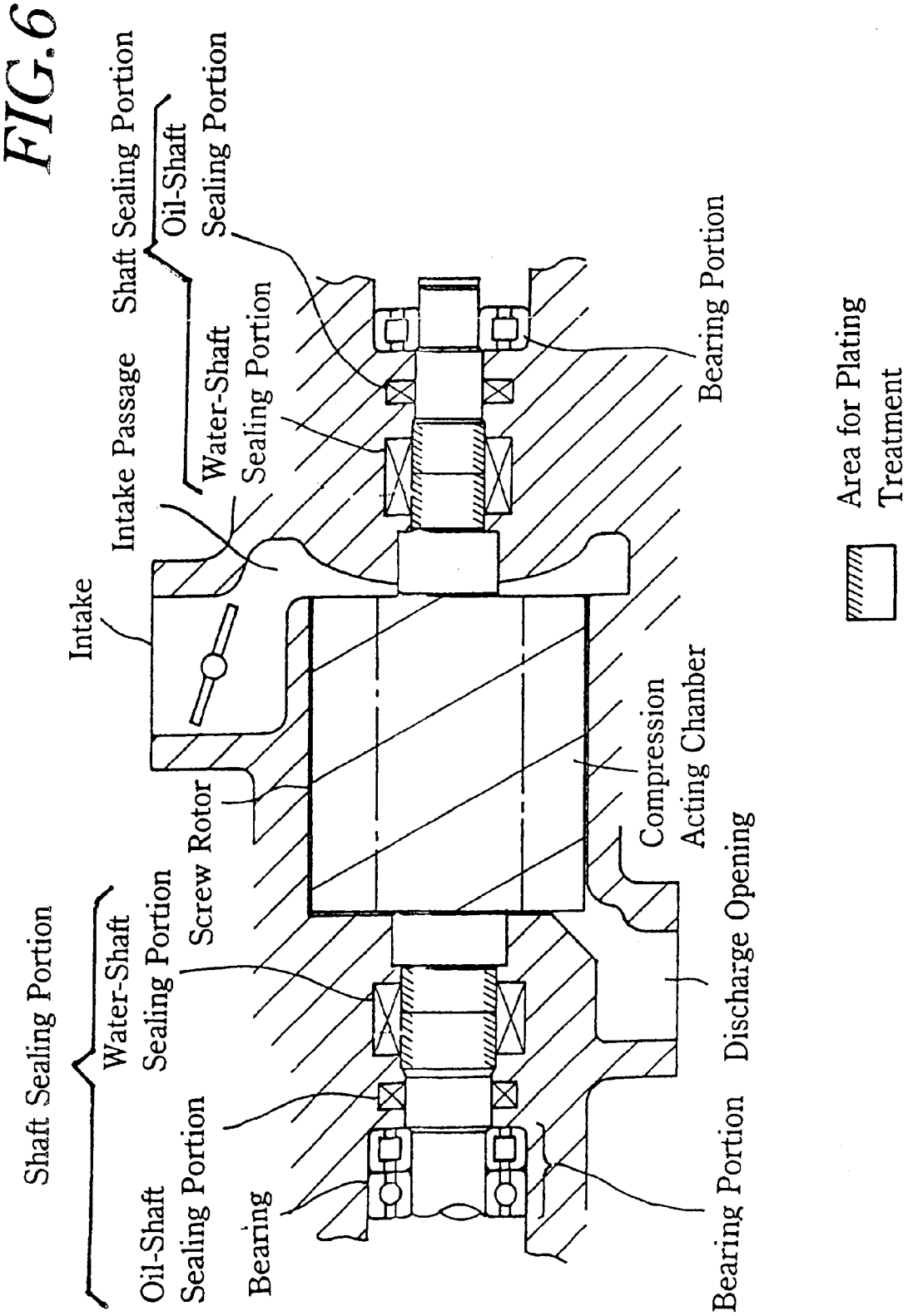

SHAFT STRUCTURE IN SCREW ROTOR OF SCREW FLUID ASSEMBLY

CROSS-REFERENCE

This patent application is a divisional application of patent application No. 09/111,446, filed on Jul. 8, 1998.

BACKGROUND OF THE INVENTION

1. Field of the Invention

The present invention relates to a shaft structure in a screw rotor used in a screw fluid assembly, and more particularly to a joint structure of a shaft of the screw rotor and a mounting structure of the shaft of the screw rotor to the rotor for the screw rotor used in a compressor, an expander, a vacuum pump and the like.

Conventionally, in a screw rotor of this kind, the rotor and the rotor shaft are integrally formed. For example, the rotor and the shaft comprising the center shaft and the rotor shaft are worked out by milling from the same metal material. Alternatively, it is proposed to mold a rotor made of synthetic resin material, for example, injection molding around the shaft made of metal to improve a processing efficiency and to reduce a gross weight.

2. Description of the Prior Art

Even if a size of the rotor is common to different kinds of machines, since a discharging pressure of the screw fluid assembly or a prime driving means are changed, or length, diameter of the shaft or surface treatment of the shaft is changed in accordance with usage of the screw fluid assembly, the manufacturing process of the rotor is complicated, and a large number of kinds of processes is required.

For such reasons, there are various problems. If the case of diameter of various portions of the screw rotor is taken as an example, in general, a diameter of tooth portion of the rotor is three or four times greater than a diameter of the shaft. Therefore, there are following problems concerning manufacture:

(1) When the rotor and the shaft are worked out by lathing from the same metal material, it is necessary to use a material having the size corresponding to the diameter of the rotor tooth portion, and to lathe the material to a desired shaft diameter by lathing operation. Therefore, this wastes materials and necessitates a number of steps for the process.

(2) When a rotor made of thermosetting synthetic resin is integrally molded around the shaft made of metal, this case only requires a metal material having a diameter of the shaft. However, since the axial length of such metal material is too long with respective to its diameter, it is necessary to prepare a remedy for a prevention of oscillation of center of a work at the time of working, which lowers the productivity.

(3) Further, the axial length of the rotor is also long, a mold of the rotor is increased in size and price, and the workability at the time of molding is also inferior. Further, the operating performance for a surface treatment is likewise inferior.

(4) For example, when the rotor and the shaft are used for a water-injection type compressor or the like in which water is injected into a compressed space for cooling in the space and tightly sealing up the space, and in which the shaft contacts with atmosphere or fluid including moisture, rust is generated when they are used for a long time, which may cause a leakage of the shaft sealing portion or abnormal abrasion of the sliding portion.

(5) Even if the tooth size of the rotor is common, since the diameter or length of the shaft is different, parts can not be used in common and the manufacture and management are complicated.

As countermeasures or remedies for the above problems, Japanese Utility Model Application Laid-open (Kokai) No.S57-105418 proposed to separately work out a hollow small-diameter portion and a hollow large-diameter portion of the screw rotor so as to reduce the weight, and to joint corresponding opposed ends of both the portions by friction welding, thereby providing a screw compressor. This proposal is to hollow the shafts, and joint them by friction welding, and is not to solve the above described various problems. Japanese Utility Model Application Laid-open No.S56-49311 proposed to simply spline-connect crankshafts, and to charge elastic material to the spline-connected portions, thereby reducing both the friction and noise. Further, Japanese Utility Model Application Laid-open No.H2-71108 proposed to form a groove in one of a propeller shaft or a yoke, and to form, on the other, a projection to be meshed with the groove. Furthermore, Japanese Patent Publication (Kokoku) No.S52-25562 proposed to integrally provide an impeller of a compressor with a sleeve having a threaded hole, and a threaded portion of a shaft is received in the threaded hole and assembled. However, these proposals are only related to a general mounting operation for enhancing the reliability, and are not for solving the above described various problems.

A conventionally known screw rotor of this type is shown in FIG. 12 as an example relating to a screw rotor formed by molding a rotor made of synthetic resin by injection molding around the above described shaft made of metal.

Each of FIGS. 12 (A) and 12 (B) show a female rotor, wherein FIG. 12 (A) is a partial sectional view taken along the line A—A in FIG. 12 (B), and FIG. 12 (B) is a front view thereof. A shaft 41 comprises a center shaft 38 and a rotor shaft 36 of these screw rotors. The shaft 41 is formed at its peripheral surface with a single or a plurality of grooves 39 or projections each having a square cross section (a quadrilateral) with a lead angle in the torsion direction and its opposite direction of teeth 46 of a rotor 1f, thereby reinforcing a connecting force between the shaft 41 and the rotor 1f to prevent them from leaving off (see, e.g., Japanese Patent Applications Laid-open No.H6-123292 and No.1-301976).

In these screw rotors, rotor surfaces are formed of synthetic resin, and therefore rust is not generated.

Therefore, the screw rotor of this kind is most suitable for a screw compressor (water-injection type screw compressor) in which water is injected in a space where compression action is performed (hereinafter also called as a compression space).

In a screw rotor in which the groove 39 having a square cross section is formed on the peripheral surface of the shaft 41 and synthetic resin material is molded thereon to connect the shaft 41 and the rotor 1f, stress concentration is generated on an angle portion of the groove of the rotor (synthetic resin portion) corresponding to a crest of the groove 39 provided on the shaft surface by a difference in a coefficient of linear thermal expansion based on difference in material of the shaft and the rotor at the time of cooling the rotor made of synthetic rotor after injection molding, and by a difference in thermal shrinkage between the shaft 41 made of metal and the rotor made of synthetic resin (thermal shrinking amount of the shaft is small, and thermal shrinking amount of the rotor is large) due to thermal change, at the further time of driving the compressor and at the time of stopping the compressor, and by a large variation in revolutional torque due to variation in load during the driving.

By the above described reasons, in the screw rotor of this type, a crack 51 is prone to be generated from the angle portion of the crest of the groove 39 provided on the shaft surface toward the bottom of the tooth of the rotor 1f, and while driving and stopping operations of the screw rotor are repeated for a long time of period, there is a problem that the crack is spread and fixing force between the shaft 41 and the rotor 1f is lowered and finally the shaft and the rotor are separated.

On the other hand, when the case of the water-injection type screw compressor is taken with reference to FIG. 6, if the screw rotor of the above-described type is employed, since the rotor is made of synthetic resin, there is a characteristic that rust can be prevented. However, there is a problem that rust may be generated on the shaft surface because the shaft 1 is made of metal, and the shaft surface between the compression chamber and the shaft sealing portion (Water-shaft sealing device) contacts with water supplied in the compression chamber.

As described above, in the conventional screw rotor of the water-injection type screw compressor, if rust is generated on the shaft portion, especially on the shaft surface into which a shaft sealing device for water is fitted, the shaft surface is corroded by the rust, and a diameter of such portion is reduced to cause a clearance between the shaft sealing device, and the shaft surface or the shaft sealing device itself is damaged to lower the shaft-sealing performance.

As a result, water supplied to the compression chamber leaks from the clearance between the shaft sealing device and the shaft surface toward the end of the shaft of the screw rotor, and flows into a bearing portion adjacent to the shaft sealing portion, which induces a deterioration of lubricant oil or emulsification to shorten life span of the bearing, and remedy therefor has been required.

Further, there are various problems that since the performance of the shaft sealing portion is lowered due to the generated rust, the lubricant oil supplied to the bearing portion flows into the compression chamber from the clearance between the shaft sealing portion and the shaft surface and is mixed into the cooling and sealing water to contaminate the water, and oil is also mixed in the discharged air, which exerts a harmful influence on apparatuses which consume the discharged air.

Therefore, rust prevention remedies have been applied by using stainless steel as material for the screw rotor shaft, or plating or coating a material having high rust prevention effect on the shaft surface to which the shaft sealing device is fitted. However, such remedies increase the prices and working costs of the screw rotors.

SUMMARY OF THE INVENTION

The first and second objects of the present invention are to make it possible by means of using a simple shaft connecting structure to employ the same rotors for various kinds of machines having different shaft lengths, to eliminate the waste of the screw rotor materials and to reduce the number of manufacturing steps to reduce the costs, and further to make it possible to separate the shafts to facilitate the handling, to reduce the molding machine in size, and to lower the manufacturing costs by working out only an exclusive shaft among the shafts of various kinds of machine facilitating the working process of the shaft.

In addition to any of the first and second objects, the third object is to prevent an assembling error between the rotor and the rotor shaft, to further reduce the manufacturing costs.

In addition to any of the first to third objects, the fourth and fifth objects are to make it possible to easily subject only a necessary portion to a rust prevention treatment or surface treatment as a remedy of rust prevention of the shaft and employ the anticorrosive material because synthetic resin is molded around the center shaft.

In addition to any of the first to fifth objects, the sixth object is that an air passage hole passing from a fitting hole concaved in the rotor shaft or the center shaft through a shaft end at opposite side is formed for smooth shaft connection so that the fitting operation of the shafts can easily and reliably be carried out, and air can flow (respiration) in the recess according to a difference in temperature during the operation and during the stoppage.

In addition to any of the first to sixth objects, the seventh and eighth objects are that since the linear expansion coefficient of a material to be fitted over the center shaft is smaller than that of a material of the center shaft, thereby generating an action in a direction to fasten the fitting condition by conduction heat due to compressing action to reliably hold the fitted state for a long time of period.

The ninth object of the present invention is to solve all of the problems indicated above concerning a screw rotor having a rotor made of synthetic resin around a shaft made of metal, to strengthen the fixing force between the shaft and the rotor, to eliminate the stress concentration around the fixing portion generated due to thermal change, to prevent the rust from being generated on the shaft surface in the shaft sealing portion, and to provide a low priced screw rotor having a high processing efficiency.

To achieve the first to eighth objects, according to the present invention, there is provided a shaft structure of a screw rotor for a screw fluid assembly, comprising a rotor forming a screw teeth form and a center shaft projecting from at least one of outer ends of the rotor on an axis thereof, wherein the center shaft is provided at its outer end with a small-diameter shaft such as to form a step between the outer end of the center shaft and the small-diameter shaft, and a separate rotor shaft provided with a concaved fitting hole is fitted over the small-diameter shaft, thereby jointing both the shafts.

Alternatively, the shaft structure of a screw rotor for a screw fluid assembly, comprises a rotor forming a screw teeth form and a center shaft projecting from at least one of the outer ends of the rotor on an axis thereof, wherein the center shaft is formed at its outer end with a concaved fitting hole, and a separate rotor shaft from which a small-diameter shaft is projected is fitted into the concaved fitting hole, thereby jointing both the shafts.

Further, to achieve the ninth object, according to the present invention, there a shaft made of metal around which synthetic resin is molded is provided with a step and/or expanded portion, and the portion of the shaft around which synthetic resin is molded is provided at its surface with a corrugated groove or spiral groove, and a cross section of the spiral groove or corrugated groove taken along the plane including the center line of the shaft is formed by an outline connecting adjacent arc groove surfaces so as to form a smooth arc curved line.

BRIEF DESCRIPTION OF THE DRAWINGS

The objects and advantages of the invention will become understood from the following detailed description of preferred embodiments thereof in connection with the accompanying drawings in which like numerals designate like elements, and in which:

FIG. 5 is a sectional view of a screw rotor according to the fourth embodiment of the present invention;

FIG. 6 is a schematic sectional view of an essential portion of an example of a compressor or a conventionally known water-injection type screw compressor;

DETAILED DESCRIPTION OF THE PREFERRED EMBODIMENTS

Although embodiments of a screw rotor of the present invention will be described hereinafter with reference to the drawings, among subject matters constituting the embodiments, there are included ones which can variously be modified by a person skilled in the art within a normal technical level in the art at the time when the present application was filed. Therefore, it is not allowed to interpret the subject matters of the present invention by defining based on a specific structure disclosed in the embodiments without showing specific reasons.

Figure 1:
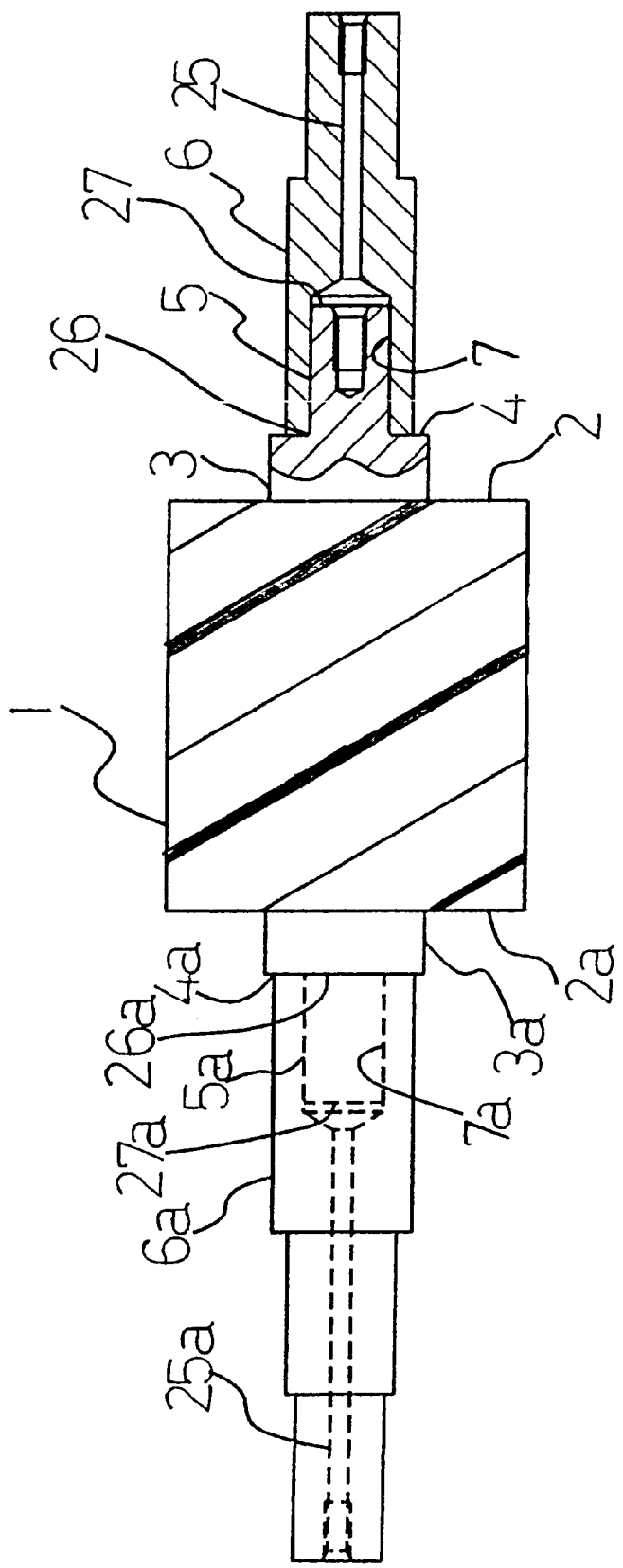
FIG. 1 is a sectional view showing a screw rotor of the first embodiment of the present invention.
Figure 2:
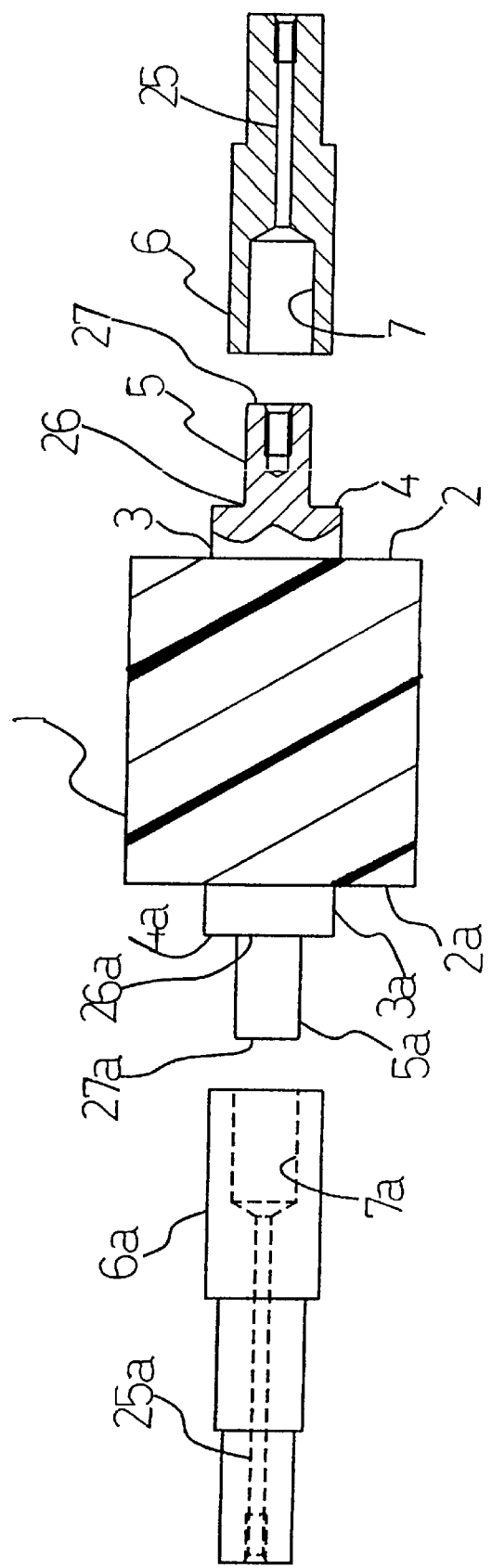
FIG. 2 is a sectional view showing the screw rotor before shafts are jointed according to the first embodiment of the present invention.

The present invention will be described below, conveniently taking the case of a screw fluid assembly as an example. The description will be made based on the embodiments shown in FIGS. 1 to 5. As shown in FIGS. 1 and 2, for example, a center shaft 3 is provided on a rotor 1 forming a screw teeth, and the center shaft 3 is provided such as to extend from at least one outer end 2 on the axis of the rotor 1, or by molding a rotor made of synthetic resin around a shaft made of metal, the center shaft 3 is projected from at least one outer end on the axis of the rotor, and the center shaft 3 is provided with a step at an outer end 4 from which a small-diameter shaft 5 projects, and a separate rotor shaft 6 formed with a concaved fitting hole 7 is fitted over the small-diameter shaft 5, thereby jointing the shafts. In this case, the other end 2a of the rotor 1 is preferably provided with a center shaft 3a, a small-diameter shaft 5a, a separate rotor shaft 6a and a concaved fitting hole 7a which are the same as those described above. The distances from a base end 26 to the outer end 2 of the rotor which is the rotor end face, and from a leading end 27 to the outer end 2 are substantially the same as the distances from a base end 26a to the outer end 2a of the rotor which is the rotor end face, and from a leading end 27a to the outer end 2a, respectively, with respect to the rotor 1. FIG. 2 is a sectional view showing the screw rotor before jointing the shafts, like numerals designate like elements and detailed description will be omitted.

Hereinafter, in the present invention, a rotor includes a rotor teeth formed with screw teeth.

Figure 3:
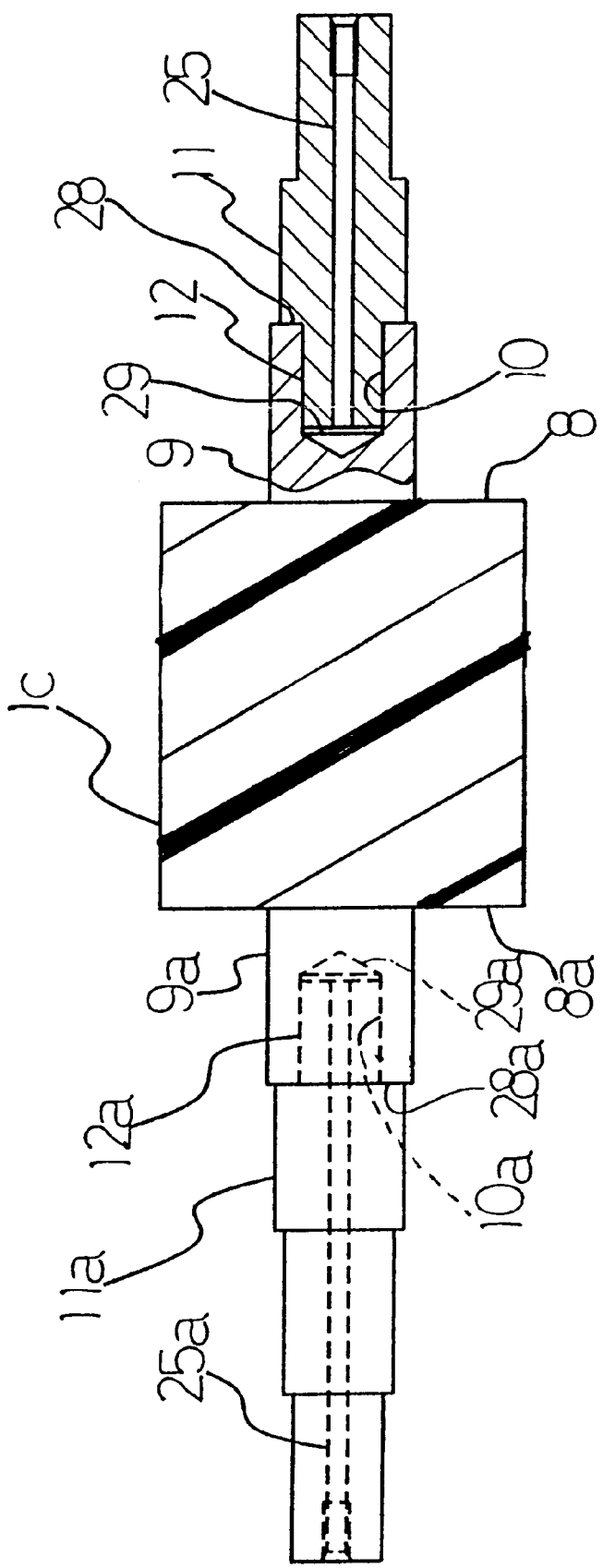
FIG. 3 is a sectional view of a screw rotor according to the second embodiment of the present invention.

Also, as shown in FIG. 3, the shafts may be jointed by extending a center shaft 9 from at least one outer end 8 on the axis of the rotor 1c forming the screw teeth, and the center shaft 9 is provided with a concaved fitting hole 10 in the outer end, and by fitting a separate rotor shaft 11 projectingly provided with a small-diameter shaft 12 into the concaved fitting hole 10. In this case, it is preferably to form a concaved fitting hole 10a in an outer end of the center shaft 9 extending from an outer end 8a of the rotor 1c, a small-diameter shaft 12a is projected from the separate rotor shaft 11a, and the small-diameter shaft 12a is fitted into the concaved fitting hole 10a which is the same shaft-joint structure as described above. In this case, it is preferable that the distances between a beginning end 28 of the concaved fitting hole 10 formed in the center shaft of the rotor 1c to the outer end 8 of the rotor which is the rotor end face, and between an innermost end 29 of the concaved fitting hole 10 and the outer end 8 are substantially the same as those between the beginning end 28a of the concaved fitting hole 10a formed in the center shaft of the rotor 1c to the outer end 8a of the rotor which is the rotor end face and between the innermost end 29a of the concaved fitting hole 10a and the outer end 8a, respectively, with respect to the rotor 1c.

As the shaft jointing means in each of the above described embodiments, a diameter of the hole is made smaller than a diameter of the shaft, and the shaft is force-fitted or shrink fitted into the concaved fitting hole. Alternatively, splines are provided in the hole and the shaft to spline-connect the hole and the shaft, or the hole and the shaft are threaded, and they may be threadedly engaged together.

Figure 4:
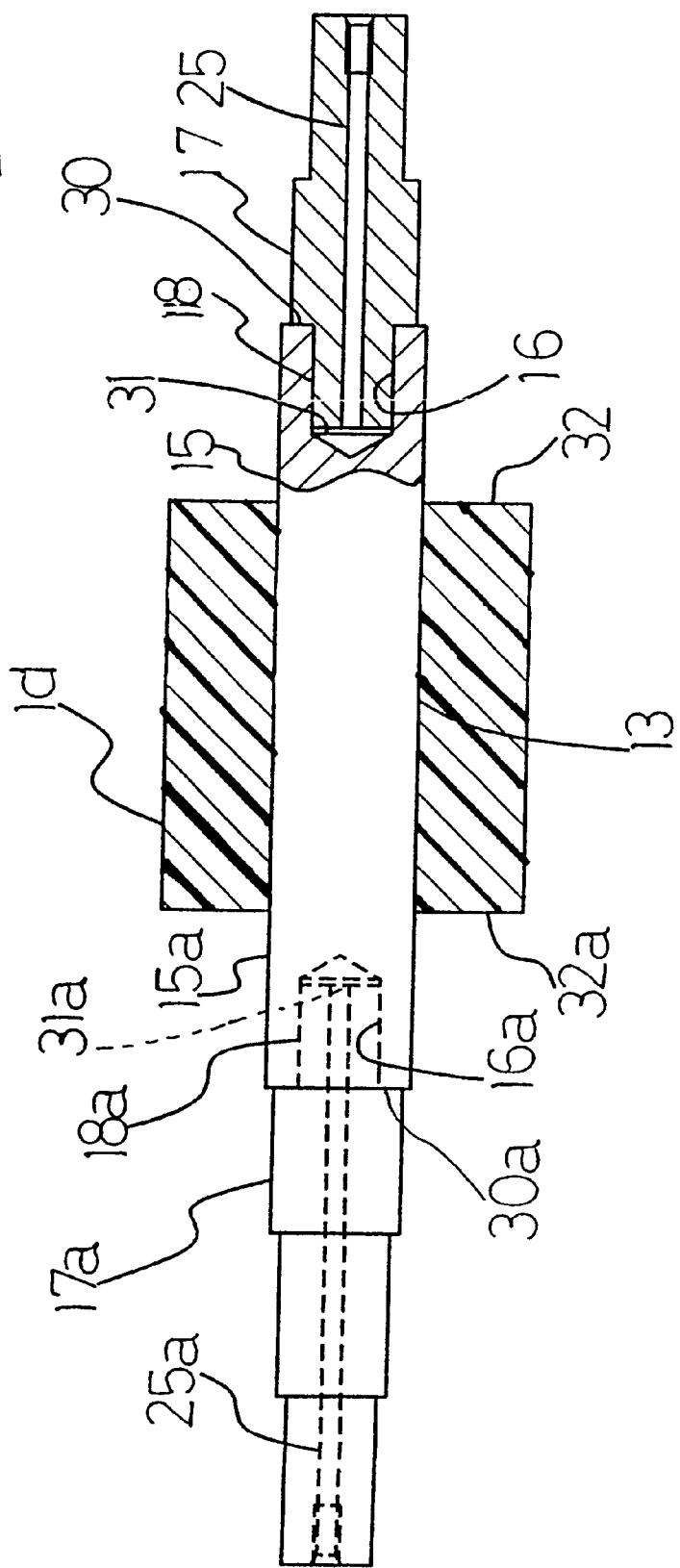
FIG. 4 is a sectional view of a screw rotor according to the third embodiment of the present invention.

Further, as shown in FIG. 4, a rotor 1d is a rotor made of thermosetting synthetic resin integrally molded around the center shaft 13 made of metal. A center shaft 15 is projectingly provided on at least one outer end 32 of the center shaft 13 made of metal of the rotor 1d, a concaved fitting hole 16 is formed in the outer end of the center shaft 15, and a separate rotor shaft 17 from which a small-diameter shaft 18 is projected is fitted in the concaved fitting hole 16, as a shaft joint structure of the third embodiment. This manner can be changed into as shown in FIG. 5, a shaft joint of fourth embodiment by extending a center shaft 20 around which synthetic resin is molded from at least one outer end 35 of the center shaft 19 made of metal of a rotor 1e, providing the outer end 21 on the center shaft 20 with a step so that a small-diameter shaft 22 is projected therefrom, and fitting the shaft 22 in a concaved fitting hole 24 formed in the end of a rotor shaft 23 which is separate from the rotor 1e.

In both of the third and fourth embodiments also, it is preferable that shaft jointing means which are the exactly the same as those shown in FIGS. 4 and 5 are provided at the outer ends 32a and 35a, respectively. By designating like elements with like numerals, description thereof will be omitted. Further, in this case also, it is preferable that the distances between the beginning end 30 of the concaved fitting hole 16 formed in the center shaft of the rotor 1d and the outer end 32 of the rotor and between the innermost end 31 of the concaved fitting hole 16 and the outer end 32 are substantially the same as those between the beginning end 30a of the concaved fitting hole 16a formed in the center shaft of the rotor 1d and the outer end 32a of the rotor and between the innermost end 31a of the concaved fitting hole 16a and the outer end 32a, respectively, with respect to the rotor 1d, and the distances between the base end 33 of the small-diameter shaft 22 provided on the center shaft of the rotor 1e and the outer end 35 of the rotor and between the outermost end 34 of the small-diameter shaft 22 and the outer end 35 of the rotor are substantially the same of those between the base end 33a of the small-diameter shaft 22a provided on the center shaft of the rotor 1e and the outer end 35a of the rotor and between the outermost end 34a of the small-diameter shaft 22a and the outer end 35a of the rotor, respectively, with respect to the rotor 1e. Further, as shaft jointing means, a diameter of the hole may be made smaller than a diameter of the shaft, and preferably, the concaved fitting hole is warmed (the shaft may be cooled) and the shaft is force-fitted in the concaved fitting hole, or splines are provided in the hole and the shaft to spline-connect the hole and the shaft, or the hole and the shaft are threaded, and they may be threadedly engaged together. Further, a technical means that an outer peripheral surface of the center shaft of the rotor around which synthetic resin of the same material as that of the rotor is molded may be employed.

In each of the above described first to fourth embodiments, shapes of the concaved fitting hole and the small-diameter shaft as shaft jointing means can be circular, triangular, rectangular or polygonal, and further, both sides of the rotor can be shaped differently such that the center shaft may be formed at its one end with a concaved fitting hole and projectingly provided at its other end with a small-diameter shaft. Further, as shown in FIG. 4, synthetic resin is not molded around the extended portion of the center shaft 13 made of metal of the rotor 1d, and as shown in FIG. 5, there is a center shaft 20, the extended portion of the center shaft 19 made of metal of the rotor 1e around which synthetic resin is molded. However, depending on an operating condition or the like, synthetic resin may not be molded around the extended portion of the center shaft 19 made of metal of the rotor 1e, or synthetic resin may be molded around the extended portion of the center shaft 13 made of metal of the rotor 1d.

Further, in addition to any of the embodiments shown in FIGS. 1 to 5, the respective rotor shafts 6, 6a, 11, 11a, 17, 17a, 23 and 23a are provided at substantially center of the axes thereof with air passage holes 25, 25a, . . . which pass from the respective concaved fitting holes 7, 7a, 10, 10a, 16, 16a, 24 and 24a formed in the rotor shafts or center shafts through opposite shaft end faces. Concerning the expression of the substantially center of the axes in this case, the center in this case does not have to be a geometrical center of axis because each of the air passage holes 25, 25a, . . . can be in communication with the air through on any portion of each of the concaved fitting holes 7, 7a, 10, 10a, 16, 16a, 24 and 24a; therefore, such center is called substantially center of axis in the present invention (a hole may be provided by penetrating a center hole for working of each rotor shaft at the time of fabrication.

Further, the material for each of the rotor shafts 6, 6a, 23 and 23a fitted over the center shaft of the rotor is a metal material having a linear expansion coefficient smaller than that of a material used for the center shaft. Or, the material used for the center shaft of the rotor is a metal material having a linear expansion coefficient smaller than that of the rotor shafts 11, 11a, 17 and 17a fitted in the center shaft.

Next, an operation and main functions will be described based on a compressor shown in FIG. 6. A rotor and separate rotor shafts constituted by using various shaft jointing means of each of the embodiments are not changed at all on the outside as shown in FIG. 6, and a function of the screw rotor of the screw fluid assembly is not changed. Thereupon, functions of various technical means of the present invention will be described. Because the rotor and the separate shafts are formed into separate structures, a size of rotor (including rotor teeth) can be common, and the mass production is possible using an exclusive working machine, whereas the shafts are individually worked out. And after the rotors and shafts are completed, they are fitted and jointed together by, for example, shrink fitting to form desired rotor assemblies. Therefore, the completed screw rotor assemblies are stable in working quality and performance, and it is possible to largely reduce the number of working steps and to reduce the manufacturing costs. Further, by making the parts common, it becomes easy to manage the parts.

Further, because synthetic resin is molded around the center shaft, the shaft is prevented from rusting, and even if the contact should be caused in a slight clearance of the shaft sealing portion between the operating chamber and the bearing chamber during operation of the fluid assembly, the seizure does not take place.

Further, when the center shaft and the rotor shaft of the screw rotor are fitted, air remaining in the recess escapes outside from the air passage hole formed in the rotor shaft. Therefore, air in the recess can flow (respiration) according to the difference in temperature during the operation and stoppage, and joint can be maintained reliably.

Furthermore, since the linear expansion coefficient of the material at the side fitting over the center shaft is smaller than that of the shaft to be fitted in, heat conducted due to compressing operation acts in a direction to tighten the fitting. Therefore, it is possible to reliably hold the fitting state for a long time period. When the rotor teeth portion or the rotor shaft is worn during long time operation, only a required part should be exchanged at the time of overhaul.

Figure 7A:
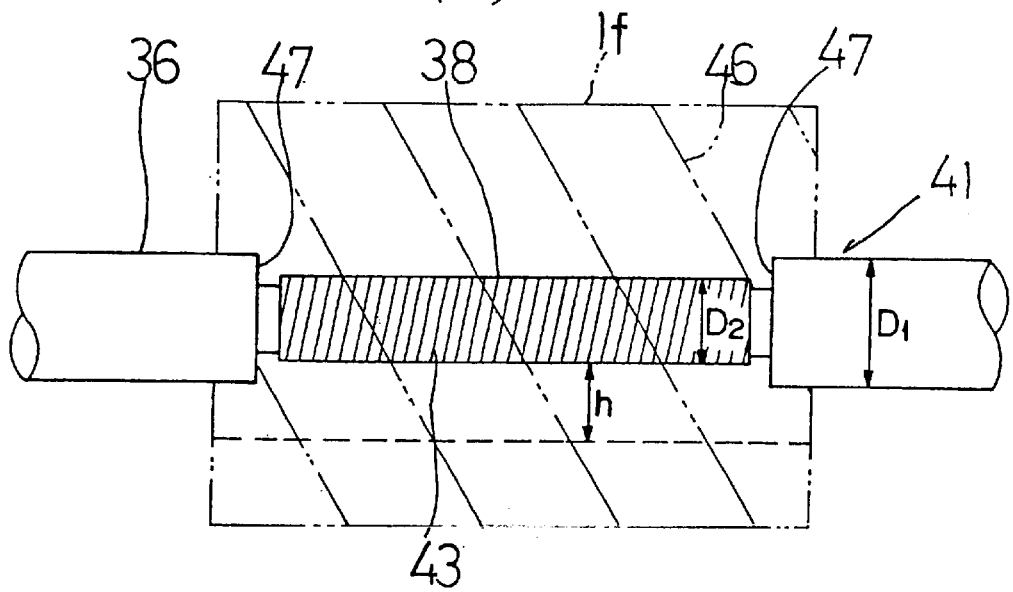
FIGS. 7a–7d are a side sectional view of a screw rotor and enlarged partial sectional views of a spiral groove of one embodiment of the present invention.
Figure 7B:
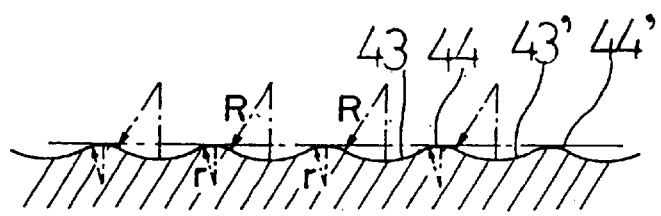
Figure 7C:
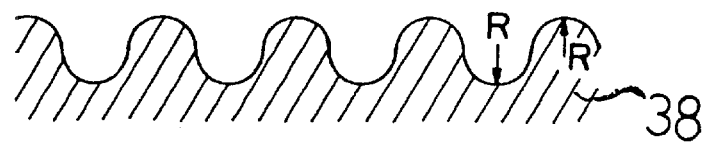
Figure 7D:

FIG. 7(A) is a schematic side sectional view showing a screw rotor of one embodiment of the present invention, and FIGS. 7 (B) to (D) are enlarged sectional views of a spiral groove or corrugated groove.

In the drawings, a shaft 41 made of metal is provided with steps 47 by partially reducing a diameter of the shaft 41 in the axial direction, and a center shaft 38 comprising this small-diameter shaft portion is provided at its axial peripheral surface with small spiral groove 43, thread or corrugated groove, having arc groove and crest at its cross section. In the present embodiment, the spiral groove 43 is a single thread, but even if it is a multiple thread, the same function and effect can be obtained.

In FIG. 7 (B) showing an enlarged sectional view of the spiral groove 43, the crest 44 where the arc profiles R of adjacent grooves 43 and 43' are connected is formed to be rounded so that the crest profile may be connected to the profile of groove 43 by smooth curved profile in order to make the peripheral surface of the shaft 38 no angle portion.

As shown in FIG. 7 (B), in the cross section of the spiral groove 43, a radius r of the rounded crest 44 is made different from a radius R of the arc groove, for example, a semi radius axis, but as shown in FIG. 7 (c), a radius of said r may be set to a length R which is the same as the arc groove, and the arcs can directly be connected.

Further, the shape of the cross section may be a ridge shape connecting the arcs r forming the groove and crest by straight line, or substantially Whit worth thread shape (see FIG. 7 (D)).

Referring again to FIG. 7 (A), the spiral groove 43 is a spiral groove having an opposite revolutional direction with respect to a revolutional direction when the screw rotor is operating. That is, when a male rotor is rotated right-handed or clockwise direction as viewing from the intake side shaft end, the spiral groove 43 is previously structured for left-hand revolution, and a female rotor shaft meshed with the male rotor is formed with spiral groove of right-hand revolution.

The center shaft 38 comprising a small-diameter shaft portion having the spiral groove 43 is provided at its both ends with small-diameter shaft portion slightly smaller than the spiral groove 43 to provide milling undercut (grooves) for cutting blade for working out the spiral groove 43.

If a shaft diameter D2 of the center shaft 38 comprising the small-diameter shaft portion having the spiral groove 43 is set smaller than a shaft diameter D1 of the rotor shaft 36 (D1>D2), it is possible to increase a distance h between a peripheral surface of the center shatf 38 around which the synthetic resin is molded and a bottom of the tooth groove (shown by dotted line) of the synthetic resin rotor. Therefore, even if a crack is generaited in the synthetic resin in the vicinity of the shaft portion, it is very rare that the crack reaches the teeth space of the rotor.

A depth of the groove of the spiral groove 43 is relatively shallow compared with the diameter of the shaft. For example, the depth and the diameter are in the ratio of about 1%. This arrangement reduces the thermal shrink stress generated around the portion of the synthetic resin molded around the groove to a small degree.

46 denotes a tooth of synthetic resin rotor 1f molded around the shaft 41.

47 denotes a step provide on the shaft 41 for supporting an axial thrust of the rotor 1f. The angle portion of the step 47 is rounded at small scale arc R or chamfered so as to avoid stress concentration.

In the present embodiment, when glass phenol resin having phenol resin and glass fiber as main component is used for example as the synthetic resin to be molded around the shaft 41, since the linear expansion coefficient of the synthetic resin is similar to that of metal (here, steel or cast iron), in a compressor using such a rotor, it is possible to reduces the stress generated due to a difference in thermal shrinking amount between the shaft 41 and the rotor 1f during the operation and stoppage to a small degree.

The synthetic resin for the rotor is not limited to the glass phenol resin; any component of a resin can be used for the rotor if the resin satisfies the characteristics such as mechanical strength and can minimize at the smallest possible stress generated due to thermal change by using such synthetic resin having the thermal expansion coefficient similar to the linear expansion coefficient of the shaft material.

Figure 8:
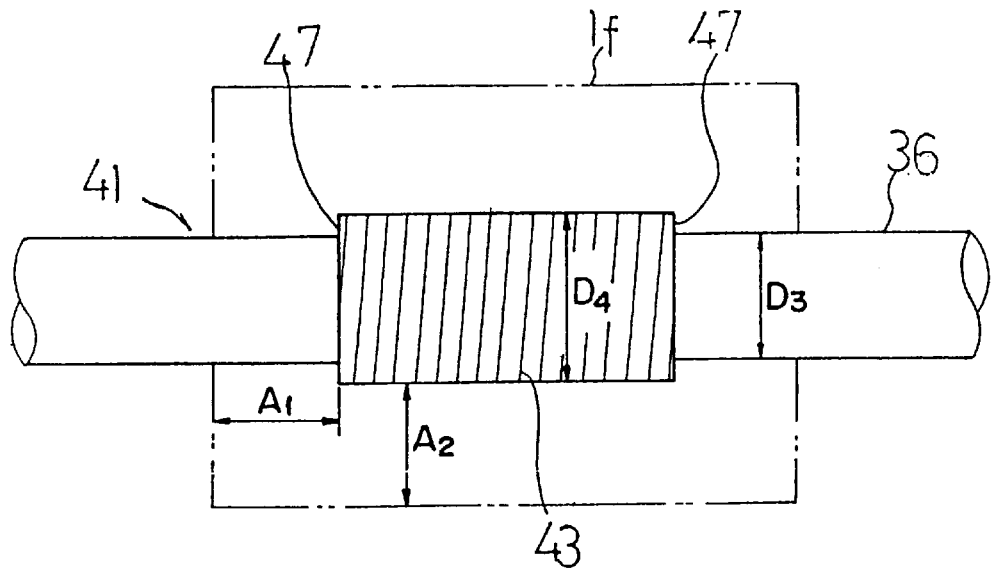
FIG. 8 is a side sectional view of a screw rotor of another embodiment of the present invention.

FIG. 8 shows a partial sectional view of a screw rotor of another embodiment of the present invention. Among the numerals indicated in the drawing, the elements having the same numerals as those in FIG. 7 (A) show the common elements of said embodiment.

In the present embodiment in which a shaft diameter D4 of a portion of the shaft 41 around which synthetic resin is molded and which has the spiral groove 43 is greater than a shaft diameter D3 of the shaft 41 including intake side and discharge side of the rotor shaft 36 (D4>D3), surface area of a portion provided with the spiral (corrugated) groove 43 is increased, which reinforces the fixing force between the shaft 41 and the rotor 1f.

At that time, since it is unnecessary to provide the groove 41 with a milling undercut groove for working out the spiral groove 43, there is no possibility to lower the strength of the shaft 41. The step 47 provided between the shaft diameter D4 and the shaft diameter D3 supports the thrust force acting on the rotor 1f made of synthetic resin. The shape of the step 47 is as described above.

In the present embodiment, when a distance between an outer peripheral surface of the center shaft 38 on which the spiral groove 43 is formed and an outer periphery of the rotor 1f is denoted by A2, and a distance between the end face of the rotor 1f and the step 47 of the shaft 41 on which the spiral groove 43 is formed is denoted by A1, if A1=A2, a cooling speed of the synthetic resin material in the vicinity of the shaft 41 is uniformed during the cooling of the synthetic resin rotor 1f after it is molded, and internal stress generated in the rotor is reduced and therefore, the possibility of crack generated in the synthetic resin is reduced.

In the case of the present embodiment also, a shape of a cross section of the spiral groove 43 can be the groove shape as shown in FIG. 7.

Figure 9:
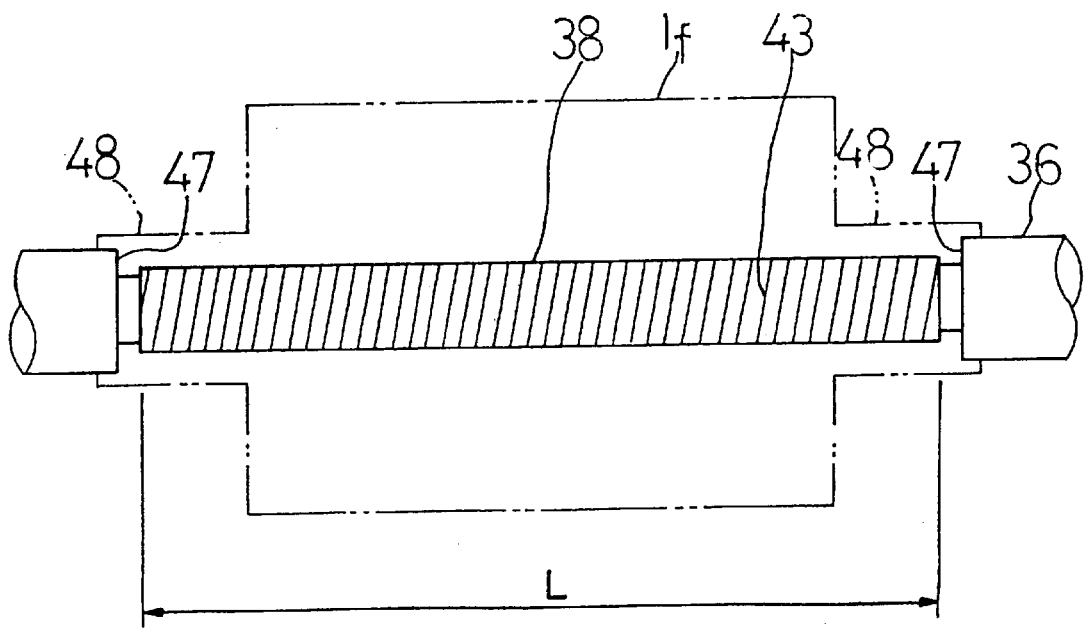
FIG. 9 is a partial side sectional view of a screw rotor of another embodiment of the present invention.

FIG. 9 shows a partial sectional view of a water-injection type screw compressor of a screw rotor of another embodiment of the present invention. A step is provided between the intake side shaft sealing portion and discharge side shaft sealing portion so that the diameter of the center shaft 38 may be smaller than that of the shaft 41 including the intake side and discharge side rotor shafts 36, and the center shaft 38 comprising the small-diameter shaft portion is provided at its axial peripheral surface with a spiral groove or corrugated groove.

Preferably, the steps are provided in such a way that L (the distance between two steps) may be longer than a distance between the intake side and discharge side water-shaft sealing devices, and may be shorter than a distance between the intake side and discharge side oil-shaft sealing devices. The shafts 48 around which synthetic resin is molded and in which shaft sealing devices are fitted are integrally and continuously extending at both opposite end faces of the rotor 1f.

The numerals are denoted in common to the description of FIG. 7.

In the case of the present embodiment, since a range L in which the steps are provided can be long, the axial length of portion on which the spiral groove or corrugated groove is formed is long, and the surface area of the shaft is increased and the fixing strength between the shaft 41 and the synthetic resin rotor is increased. Further, synthetic resin is molded around the shaft in which the water-shaft sealing device is fitted and therefore, even if it is used for the water-injection type screw compressor, rust is not generated on the rotor, the shaft and the like.

Figure 10:
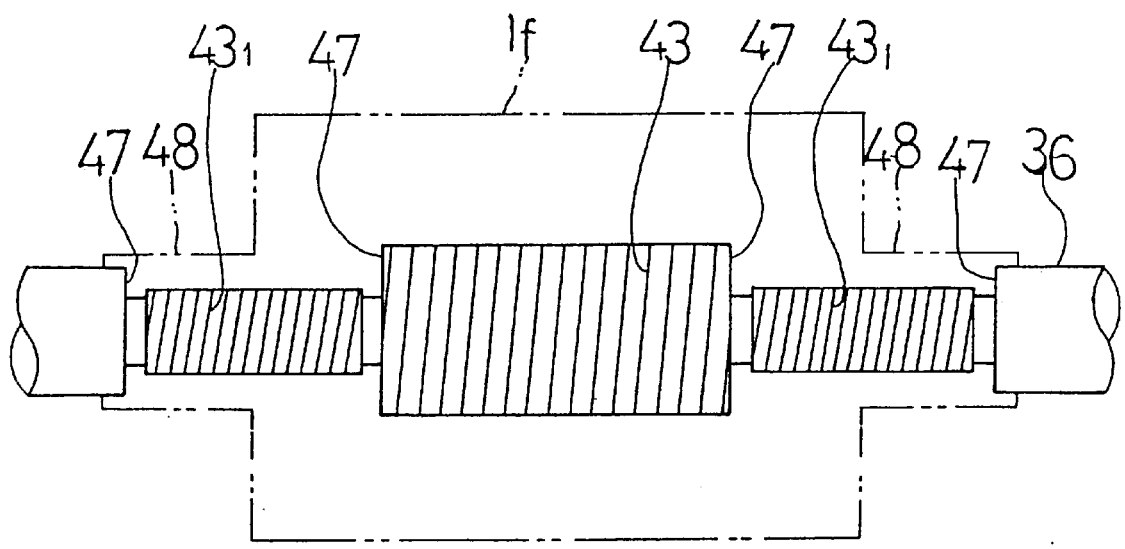
FIG. 10 is a partial side sectional view of a screw rotor of another embodiment of the present invention.

FIG. 10 is a partial sectional view of a screw rotor of another embodiment of the present invention, and the numerals are used in common to those in the descriptions of FIGS. 7 to 9.

In the case of the present embodiment, the diameter of the shaft portion (a portion on which the spiral groove 43, is formed) around which synthetic resin is molded, forming the shaft sealing portion, is smaller than the diameter of the shaft portion (a portion on which the spiral groove 43 is formed) around which synthetic resin forming the rotor 1f is molded, thereby providing a plurality of steps 47 therebetween to secure a thickness of the synthetic resin forming the shaft sealing portion to prevent crack from being generated in the synthetic resin.

Further, the depth of groove of the spiral groove 43, is made shallower than the depth of groove of the spiral groove 43, thereby preventing crack from being generated in the synthetic resin which forms the shaft sealing portion.

The above described groove is not limited to a spiral groove, and if a corrugated groove is formed, the same effect can be obtained.

In the present embodiment, since the diameter of the shaft portion around which synthetic resin is molded (a portion on which the spiral groove 43 is formed) is relatively large, and the axial length of the portion on which the spiral groove is formed is long, the surface area of the shaft is increased so that the fixing strength between the shaft 41 and the synthetic resin rotor 1f can be increased.

Figure 11:
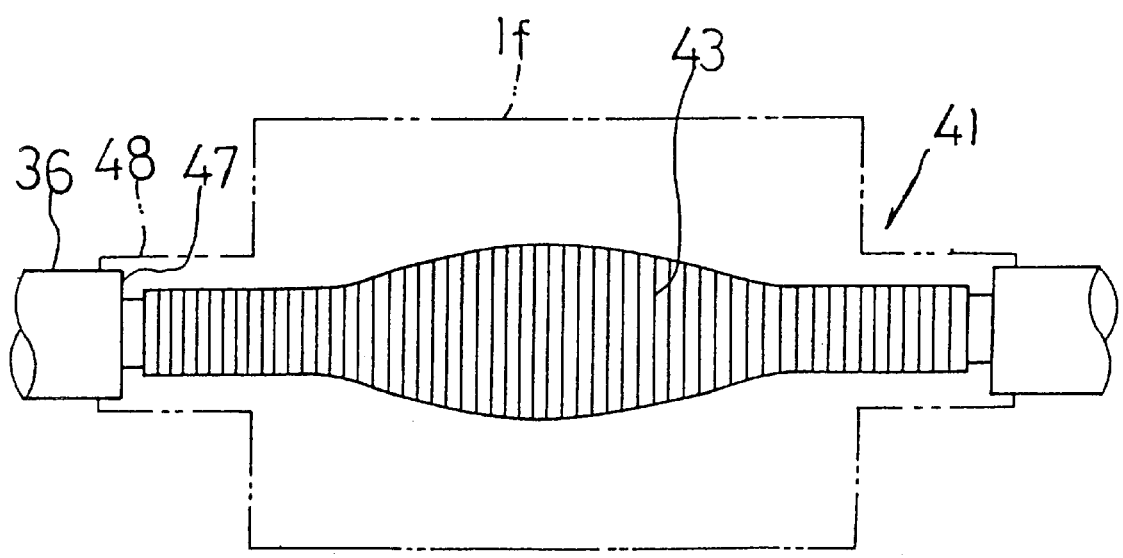
FIG. 11 is a partial side sectional view of a screw rotor of another embodiment of the present invention.
Figure 12A:
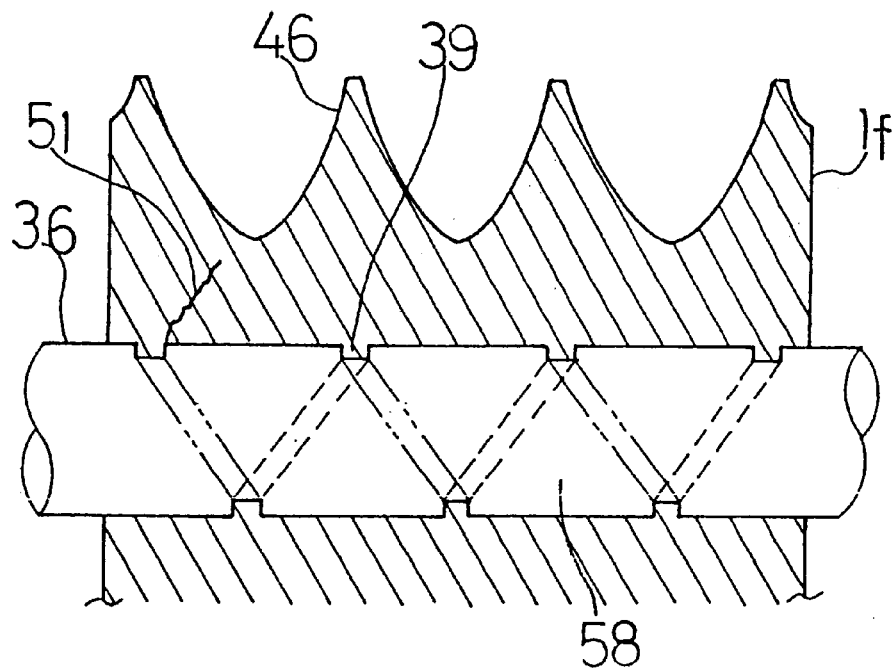
FIGS. 12a–12b are a partial sectional view and a front view of one example of a conventionally known screw rotor.
Figure 12B:
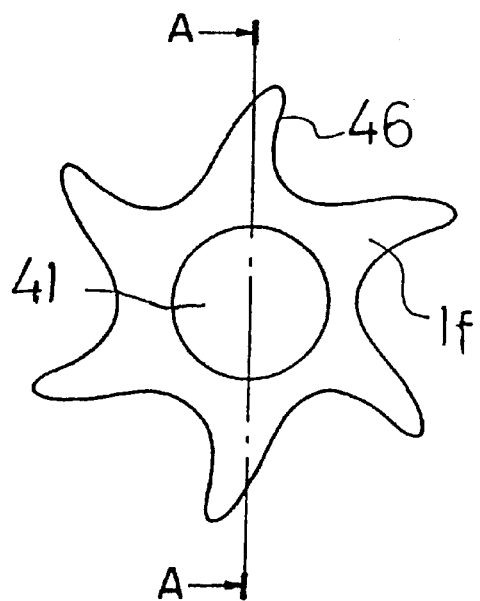

FIG. 11 is a partial sectional view of another embodiment, and the numerals are used in common to those in the descriptions of FIGS. 7 to 10.

The present embodiment can be called as a modification of the rotor shaft shown in FIG. 10. In the rotor the shaft portion around which synthetic resin is molded is formed by smooth curved lines, and a shaft 41 including center shaft 38 as a whole is provided at its axially central portion with an expanded portion.

Corrugated grooves or spiral grooves 43 are formed on the entire peripheral surface of the shaft portion around which synthetic resin is molded.

According to the present embodiment, arc surfaces of the center shaft 38 disperse and support the thrust acting on the rotor 1f. Therefore, stress is not concentrated, and the possibility of cracks of synthetic resin is reduced.

Although it is not illustrated in the drawings, if the shaft 41 is casted, and the shaft 41 around which synthetic resin is molded is left as casted state (cast sands attached on the surface are completed removed), and if the shaft surface except the portions around which synthetic resin is molded is finished by mechanical working, synthetic resin enters into uneven surface of the casted surface of the shaft around which synthetic resin is molded, and the fixing structure between the shaft and the rotor can be strengthened, and the number of working steps can be reduced.

The present invention is so constituted as explained above, and has the effects described below.

Firstly and secondly, since the rotor and the shaft of the screw rotor are of separate structures, if the size of the rotor is the same, the same working process can be used for the rotor, thereby the productivity is improved, and stable working quality can be maintained, and it is easy to manage the parts. Further, by employing a simple shaft connection, the same rotor can be employed for various assemblies having different shaft lengths, which eliminates waste of screw rotor materials and unnecessitates the large number of working steps to reduce the costs, and the shafts can be divided and handling thereof is easy, the length of the shaft can be shortened so that a molding machine can be reduced in size, working of a shaft for exclusive use among the various machines suffices, working of the shaft is easy, and the manufacturing costs can largely be lowered. Further, as to the shaft, even in a process consisting of surface treatment and other complicated fabrication steps, the parts themselves are smaller than the rotor, handling thereof is easy and working efficiency is excellent.

Thirdly, in addition to any of the first and second effects, it is possible to prevent assembling error between the rotor and the rotor shaft, the working parts are made common, and further reduction of manufacturing costs can be achieved.

Fourthly and fifthly, in addition to any of the first to third effects, since synthetic resin is molded around the center shaft, only necessary portions can be easily subjected to the rust preventing treatment or surface treatment, and anticorrosive material can easily be employed.

Sixthly, in addition to any of the first to fifth effects, by forming an air passage hole penetrating from the concaved fitting hole formed in the rotor shaft or center shaft to the shaft end opposite to the said hole, the shaft connection is smoothly fitted, and such an insertion operation is easily and reliably conducted, and air in the recess can flow (respiration) according to the difference in temperature of the recess during the operation and during the stoppage.

Seventhly and eighthly, in addition to any of the first to sixth effects, since a linear expansion coefficient of a material of the shaft the side of which is fitted over the center shaft is smaller than that of the center shaft, a force acts in a direction to fasten the fitting condition by conduction heat according to compressing effect to reliably hold the fitted state for a long time of period.

Further, ninthly, a spiral groove or corrugated groove connecting the crest and groove profiles by smooth curved line are formed on the shaft peripheral surface around which synthetic resin is molded. Therefore, stress concentration on the fixing portion at the side of the rotor is moderated, and crack generated from the fixing surface toward the tooth bottom of the screw rotor groove can be prevented, and the shaft and the rotor (synthetic resin portion) can be prevented from separating, and the fixing state therebetween can be strengthened and maintained for a long time period.

Tenthly, by providing the shaft with a step or expanded portion, the axial movement of the rotor is restrained, and even if the shaft and the rotor are separated by any reasons, damaging accident such as contact between the inner surface of the casing and the rotor end face or seizure during operation of the compressor is prevented.

Eleventhly, when the present invention is employed in the water-injection type screw compressor, no rust is generated on a portion which contacts with water, which enhance the reliability of the sealing device, and rust or oil is not mixed into discharged air. Further, since it is possible to prevent the deterioration or emulsification of the lubricant oil due to mixture of the water into the lubricant oil, the life span of the bearing can be elongated.

Twelfthly, even if the shaft is made of steel or cast iron, it is unnecessary to subject the shaft surface to plating or coating for rust prevention, and the working time can be shortened as compared with the conventional device, and the screw rotor can be manufactured at lower costs.

Thirteenthly, the present invention is not limited for use for the rotor of the water-injection type screw compressor, but it can be used for rotors for screw fluid assembly such as oil-cooling type screw compressor, oil free screw compressor, screw vacuum pump or screw expander.

Thus, the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interrupted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described;

For your reference

[Drawing to be selected for an abstract] FIG. 1

[Explanation of Numerals]

1, 1b, 1c rotor
1d, 1e, 1f synthetic resin rotor
2, 2a, 8, 8a, 32, 32a, 35, 35a outer end of rotor
3, 3a, 9, 9a, 15, 15a, 20, 20a center shaft
4, 4a, 21, 21a outer end of center shaft
5, 5a, 12, 12a, 18, 18a, 22, 22a smaller-diameter portion
6, 6a, 11, 11a, 17, 17a, 23, 23a, 36 rotor shaft
7, 7a, 10, 10a, 16, 16a, 24, 24a concaved fitting hole
13, 19 center shaft made of metal
25, 25a air passage hole
38 smaller-diameter shaft portion (center shaft comprising the said portion)
41 the entire shaft (comprising center shaft and rotor shaft)
43, 431 spiral groove
44 crest (shaped) portion
46 tooth (groove)
47 step
48 shaft (sealing) portion around which synthetic resin is molded
39 groove having square cross section
51 crack

What is claimed is:

1. A shaft structure of a screv rotor for a screw fluid assembly, wherein a shaft made of metal around which synthetic resin is molded is provided at, at least, its center shaft with a step, a surface of said shaft around which said synthetic resin is molded is provided with a spiral groove or corrugated groove, in a cross section of said spiral groove or corrugated groove taken along the plane including the center line of said shaft, the arc profile of adjacent spiral or corrugated grooves are connected by smooth curved and rounded line, and said spiral groove is formed in the opposite revolutional direction with respect to a revolutional direction of said screw rotor, and a rotor made of synthetic resin is molded around said shaft made of metal.

2. A shaft structure of a screw rotor for a screw fluid assembly, wherein a shaft made of metal around which synthetic resin is molded is provided with a step and/or expanded portion, and a surface of said shaft around which synthetic resin is molded is provided with a corrugated groove or spiral groove, and in a cross section of said spiral groove or corrugated groove taken along the plane including the center line of said shaft, the arc profile of adjacent spiral or corrugated grooves are connected by smooth curved and rounded line.

3. The shaft structure of a screw rotor according to claims 1 or 2, wherein synthetic resin is molded around said surface of said shaft continuously with said rotor made of synthetic resin, and synthetic resin is molded on an axial peripheral surface of a portion of said shaft at least between a shaft sealing portion at an intake side and a shaft sealing portion at a discharge side.

4. The shaft structure of a screw rotor according to claims 1 or 2, wherein synthetic resin which is the same as that of said rotor is molded around a surface of outer periphery of center shaft of said rotor.

5. The shaft structure of a screw rotor according to claim 4, wherein said rotor shaft is formed substantially at its center of axis with an air passage hole passing from a concaved fitting hole formed in said rotor shaft or center shaft through the opposite shaft end.

6. The shaft structure of a screw rotor according to claim 5, wherein a material of said rotor shaft which is fitted over said center shaft of said rotor has a linear expansion coefficient smaller than that of a material used for said center shaft.

7. The shaft structure of a screw rotor according to claim 5, wherein a material used for said center shaft of said rotor has a linear expansion coefficient smaller than that of said rotor shaft which is fitted into said center shaft.

* * * * *